M. J. HUGGINS.
GEAR SHIFTING MECHANISM FOR AUTOMOBILES.
APPLICATION FILED SEPT. 11, 1916.
1,314,139. Patented Aug. 26, 1919.
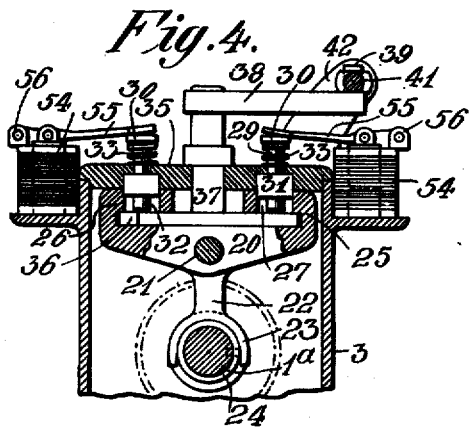
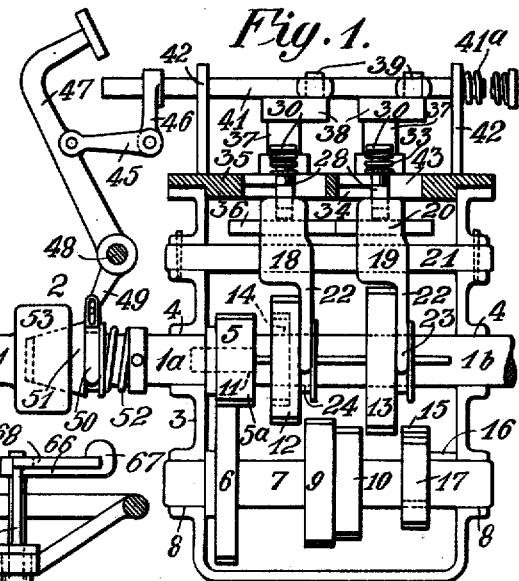
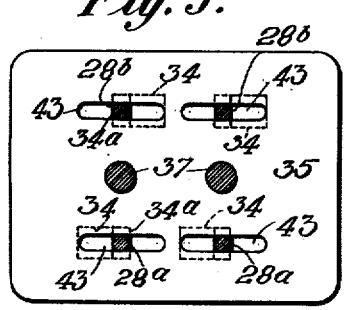
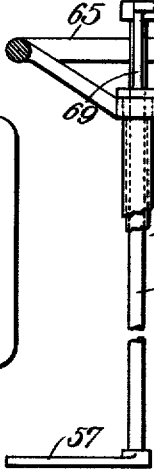
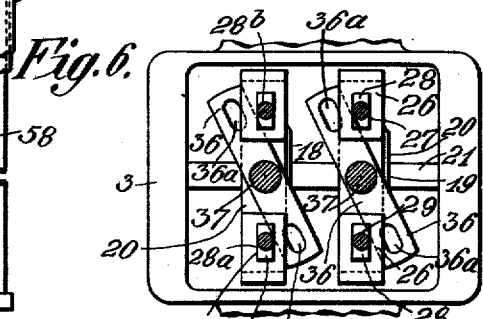
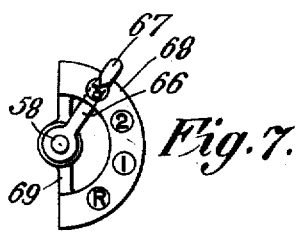
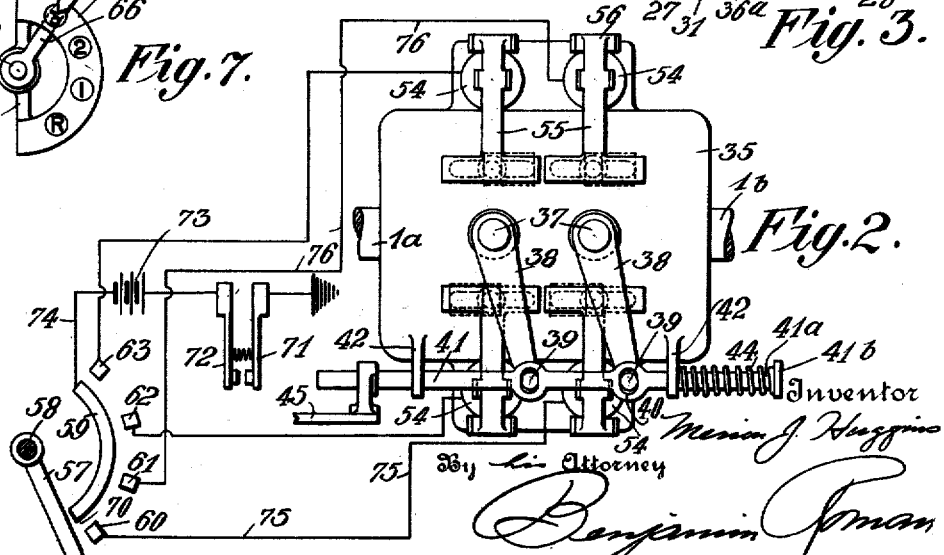
Inventor
Merion J. Huggins
By his Attorney
Benjamin Oman

UNITED STATES PATENT OFFICE.

MERION J. HUGGINS, OF NEW YORK, N. Y., ASSIGNOR TO AUTOMOTIVE DEVELOPMENT CO., INC., OF NEW YORK, N. Y., A CORPORATION OF NEW YORK.

GEAR-SHIFTING MECHANISM FOR AUTOMOBILES.

1,314,139.  Specification of Letters Patent.  Patented Aug. 26, 1919.

Application filed September 11, 1916. Serial No. 119,514.

*To all whom it may concern:*

Be it known that I, MERION J. HUGGINS, a citizen of the United States, and resident of the city of New York, in the county of Kings and State of New York, have invented certain new and useful Improvements in Gear-Shifting Mechanism for Automobiles, of which the following is a specification.

This invention relates to automobiles, particularly to the speed controlling mechanism thereof, and its principal object is to provide simple, efficient, reliable, and improved means for controlling the speed of the automobile, and for driving the automobile wheels at a variable speed relatively to the speed of the engine or prime mover.

Another object is to provide improved, conveniently operated, and readily responsive means for controlling the changing of the speeds and reversing of the wheels.

Other objects and advantages will hereinafter appear.

In the accompanying drawings,—

Figure 1 is a general view, partly in section and partly in full, showing an elevation of an automobile gear transmission, to which the invention is here shown as adapted with the operating mechanism therefor.

Fig. 2 is a general plan view of the mechanism shown in Fig. 1, with a diagram of the electric circuits in connection therewith.

Fig. 3 is a sectional plan view of the mechanism shown in Fig. 1.

Fig. 4 is a sectional end elevation of the mechanism shown in Figs. 1, 2, and 3.

Figs. 5, 6, and 7 are details of said mechanism.

A shaft 1, driven by the automobile engine, not shown, drives a section $1^a$, thereof, which is split therefrom at clutch 2, Fig. 1, and extends to the gear-casing 3, where it is mounted in bearings 4 of said casing. The shaft-section $1^a$ carries a wide gear 5 which drives a gear 6 that is keyed upon and drives a counter-shaft 7 mounted in bearings 8 of said casing. Said counter-shaft carries drive gears 9 and 10 of different sizes, and the rear shaft-section $1^b$ of the drive shaft, split from shaft-section $1^a$ at 11 and running independently thereof, carries coöperating transmission gears 12 and 13 splined to shift thereupon so that any one of said transmission gears may be caused to mesh with and unmesh from its coöperating drive gear on said counter-shaft, and various speeds may be thereby transmitted to the shaft $1^b$, which in turn drives the wheels of the automobile, not shown, at various speeds. Thus when the gears 12, 13 are unmeshed, the counter-shaft 7 driven by gears 5, 6 from shaft-section $1^a$ runs idly and no motion is transmitted to the shaft-section $1^b$, and when the gears 13, 10 are meshed a low speed is imparted to the shaft-section $1^b$. Likewise, when the gears 12, 9 are meshed a higher speed is transmitted to the shaft $1^b$, and when the gear 12 having an internal gear 14 is shifted to mesh the internal gear with the portion $5^a$ of wide gear 5 the shaft-section $1^b$ is driven at highest speed, directly from shaft-section $1^a$. In order to rotate the shaft $1^b$ oppositely for reversing the automobile wheels, the gear 13 is meshed with an intermediate idler-gear 15, which is mounted on a stud 16 fixed to casing 3 and is driven by a drive gear 17 carried upon the counter-shaft 7. The gears are meshed and unmeshed by means of arms or shifting devices 18, 19 which comprise heads 20 carried upon a guiding rod 21 secured to the casing 3, arms 22 extending from said heads, and forked portions 23 at the extremities of said arms that embrace shouldered collars 24 of the shiftable gears.

The head 20 of each shifting device extends crosswise of the guiding rod 21 and of the axes of the gears, and its ends 25 loop around upwardly and toward the rod 21, forming a pair of bands 26. Within a rectangular opening 27 in each band 26 of each shifting device is carried a locking latch 28, each of which consists of a pin 29 having a flange 30, a flattened portion 31 the lower part of which is located within the band-opening 27, and a pin-portion 32 likewise located within the opening 27. And normally a spring 33 surrounding the pin 29 of each latch 28 presses against its flange 30 and lodges the upper part of the flat portion 31 within a receiving recess 34 formed in a plate 35 secured to the casing 3, whereby each shifting device 18, 19 is firmly maintained locked and shifting thereof is prevented while the gear carried thereby is maintained locked in unmeshed state. The latch 28ª, Fig. 5, of each shifting device bears against edge 34ª of its recess 34 to prevent movement of its shifting device and gear carried thereby toward the right, and the adjacent latch 28ᵇ of the same device bears against the edge 34ª of its recess 34 to prevent movement of the gear toward the left. For each of the shifting devices 18, 19 is provided an arm 36 secured at its center to a stud 37 which is pivotally mounted in the plate 35. To each stud 37 is secured a lever 38 having a pin 39 thereof in engagement with a slotted opening 40 of a bar 41 which is mounted in fixed guiding brackets 42 to slide parallelly to the rod 21. Upon sliding the bar 41 toward the left, as viewed in the drawing, and back, a stroke may be simultaneously imparted to both of the arms 36, first in a clockwise direction from the position shown in Fig. 3 to a position which is right-angular to the rod 21, and then backwardly to their initial position shown. When the arms 36 swing they are in parallelism with each other, and when they reach a position which is right-angular to the rod 21 they are in alinement with the heads 20 of the shifting devices 18, 19 when these devices are in neutral position. In each of the extremities of arms 36 are formed openings 36ª which register with the latches 28 when the arm is in alinement with its coöperating shifting device 18 or 19 while such device is in neutral position, whereby when the shifting device is in neutral position or is approaching its neutral position and any one of its latches 28 is pressed down, contrary to spring 33, toward its arm 36 just before said arms are oscillated or just before they have completed their stroke in a clockwise direction, the upper part of the flat latch-portion 31 is caused to leave its recess 34 in plate 35 and its pin 32 is compelled to enter its registering opening 36ª in its arm 36. The particular shifting device carrying said latch is in this manner unlocked from the plate 35 and locked firmly to its arm 36 at either of its extremities, depending upon which of the two latches 28ª or 28ᵇ of the particular shifting device has been thus pressed. And hence, upon the return stroke of the arms 36 in an anti-clockwise direction the particular shifting device thus locked to its arm is carried along thereby and shifted toward the right, as viewed in the drawing, if its latch 28ª has been previously pressed, but if its other latch 28ᵇ has been pressed and the shifting device is thus locked to the opposite extremity of its arm 36 it is carried along by the swinging arm 36 in the opposite direction and shifted from neutral position toward the left, in which manner the gear carried by this shifting device can be shifted in opposite directions from a neutral position and meshed with either of its coöperating drive gears. Conversely, during a subsequent stroke of the arms 36 in a clockwise direction the shifting device previously locked thereto is shifted back, toward the left or toward the right to neutral position, depending upon the position to which it has been previously shifted, and the spring 33 of the latch which was maintaining said device locked to the arm 36 causes its portion 32 to clear the opening 36ª of the arm 36 and its portion 31 to reënter its recess 34 in plate 35 whereby the shifting device is restored to initial or locked neutral position and the gear carried thereby is unmeshed. Upon the return stroke of the same subsequent swinging of the arms 36 they either return idly or together with the other shifting device or with the same shifting device, according to whichever of said devices has been locked to its actuating arm 36. During the movement of the shifting device both of its latches 28 are carried along therewith and the pin 32 of that latch which has been pressed is maintained within its opening 36ª of the actuating arm 36 by the plate 35 bearing upon the upper face of latch-portion 31, the pin 29 of said latch being meanwhile retained within an elongated slot 43 in plate 35, Figs. 1 and 5, and the other latch being meanwhile permitted to travel along idly with the moving shifting-device by having its pin 29 retained within a similar slot 43 and the upper part of its flat portion 31 traveling within its recess 34, which is made elongated as shown, to provide clearance therefor while it is traveling idly. The movement of the rod 41 toward the left to swing the arms 36 in a clockwise direction simultaneously compresses a spring 44, which surrounds the rod-end 41ª and is adapted to press against a flange 41ᵇ of said rod-end and against the bracket 42. Upon releasing of the rod 41 after having been drawn toward the left, the spring 44 which has been thus previously compressed shifts the rod 41 back toward the right and swings the arms 36 back to initial position. A link 45 connects a crossbar 46, secured to the rod 41, with a pedal 47, which is fulcrumed at 48 and is utilized for operating the drive-shaft clutch 2. Upon pressing of the foot-pedal 47 to swing it toward the left and releasing it to permit its return swinging toward the right, in the operation of the clutch, the rod 41 is thereby drawn toward the left and in conjunction with the action of spring 44 is returned toward the right, to oscillate the arms 36 in a clockwise direction, and to swing said arms back to initial position in the above described manner. Said pedal is connected to the clutch 2 by means of an arm 49 which is slidably joined to a forked arm 50 that embraces the cone-portion 51 of the clutch. Pressing of the pedal 47 moves the cone portion 51 toward the right contrary to the pressure of clutch-spring 52 and disengages it from its coöperating clutch member 53 to unclutch the shaft-portions 1, 1ª. Releasing of the pedal causes the spring 52 to engage the cone portion 51 with the member 53 to clutch the shaft-portions 1, 1ª, and to simultaneously swing the pedal back toward the right to its normal position shown in the drawing.

A solenoid 54 is provided for each of the latches 28 which when energized causes its armature 55 hinged at 56 to press down upon the flange 30 of its latch contrary to the pressure of latch-spring 33. Said armature thereby compels the latch 28 to enter its registering arm-opening 36ª and to lock its shifting device, while it is in neutral position, to its arm 36 at the moment said arm reaches the termination of its stroke in a clockwise direction.

Circuits for the solenoids 54 are opened and closed by means of a current-conducting arm 57, which is fixed to a rocking rod 58 and may be swung therewith and about the axis thereof to contact it with a segmental terminal-plate 59 and any one of terminal contacts 60, 61, 62, and 63. The rod 58 extends from the arm 57, Fig. 6, through and outwardly from the steering column 64 of the machine, and is provided at its extremity above the steering wheel 65 with a lever 66 wherewith the rod may be rocked to swing the arm 57. A pointer 67 extends from the extremity of lever 66 and around the outer side of a segmental frame 68, which is concentric with the rod 58 and is secured to the column 64 by means of brackets 69. Upon the frame 68 are marked speed indications, such as "Reverse" or "R", "1st", "2nd", and "Direct" or "3rd", and the lever 66 with its pointer 67 may be swung to point to any one of said indications.

In the operation of the gear transmission the lever 66 may be set to point to any one of the indications upon indicator-frame 68, according to whichever coöperating pair of gears it is desired to mesh in the selection of speeds for the automobile wheels, and we will assume that said lever has been set to point to "R" or "Reverse" as shown. The arm 57 is thereby set to join the terminal-contact 60 with the terminal plate 59, and closes the break 70 of a branch circuit which when having current therethrough energizes the magnet 54 that belongs to and coöperates with the locking-latch 28ª located in shifting device 19. Lever 66 having been set to the desired speed indication, the remaining step in the operation of selecting a particular speed is to press and release the foot-pedal 47. Upon pressing of the foot-pedal the drive-shaft portions 1, 1ª are unclutched, and during the unclutching operation the rod 41 is drawn toward the left and the arms 36 are oscillated to perform their strokes in a clockwise direction. This movement of the arms 36 alines their openings 36ª with the locking latches 28 of the shifting device which is then in neutral position and carries back in alinement therewith any shifting device 18, or 19 that may have been locked thereto, and unmeshes or neutralizes the gear connected to such device and locks the device with its gear firmly in neutralized state to the fixed plate 35. Just prior to the termination of the swinging of the arms 36 in a clockwise direction and the alinement of their openings 36ª with the latches 28, the extremity of rod 41 strikes against a flexible conducting terminal-bar 71 and causes it to contact with a terminal bar 72. Contacting of the terminal-bars 71, 72 conducts the current from battery 73 along wire 74, plate 59, arm 57, terminal 60, wire 75, and through the solenoid 54 belonging to the latch 28ª of shifting device 19, wherefrom the current is returned through terminal bars 71, 72 back to the battery. Said solenoid 54 is thereby energized, and attracting its armature 55 causes the pin 32 of its latch 28ª to enter into its registering arm-opening 36ª and to lock the shifting device 19 to its arm 36. Upon the immediate releasing of the pedal 47 the shaft-portions 1, 1ª are clutched, and during the clutching operation and releasing movement of the pedal the spring 44 coöperates with the clutch spring 52 to actuate the bar 41 and levers 38 and to cause the arms 36 to be swung in an anti-clockwise direction, whereupon the shifting device 19 being locked to its arm 36 is carried along thereby and shifted with its gear 13 toward the right to mesh the gears 13, 15. The spring 44 positively maintains the shifted gear in place and prevents accidental unmeshing thereof. As the arms 36 commence to swing back toward initial position to mesh the gears the extremity of rod 41 travels away from the terminal-bar 71, and thereby allows it to withdraw from the terminal-bar 72, whereupon the circuit energizing the said solenoid 54 is broken and no more current is utilized during the continuance of the meshing of the gears 13, 15. It will be evident that the entire above described operation, of selecting and shifting the gears, is momentarily performed, requiring on the part of the operator merely the setting of the lever 66 and pressing of the pedal 47.

Should it be desired to unmesh the gears 13, 15, and to mesh any other coöperating pair of gears such as the gears 13, 10 for low speed, the lever 66 is set to point at "1", corresponding to such selection of speed, and the pedal 47 is then pressed and released. Thereupon the arms 36 are actuated and move the shifting-device 19 with the gear 13 back toward the left, whereby the gears 13, 15 become unmeshed and said device with the gear 13 is locked to the plate 35 in unmeshed or neutral position. Then the circuit is closed and the current conducted from the battery 73, along wire 74, plate 59, arm 57, contact 61, wire 76, and through the solenoid 54 belonging to the latch 28$^b$ of shifting device 19 back through terminal-bars 71, 72 to the battery. Said solenoid is thereby energized to lock the shifting device 19 to its arm 36, which thereafter shifts the device 19 with the gear 13 from neutral position toward the left and meshes the gears 13, 10.

It will be seen by following the circuits in the drawing, that in a similar manner setting of the lever 66 to point at "2nd" or intermediate speed and pressing of the pedal 47 will first unmesh and neutralize any coöperating pair of gears that may be meshed, the solenoid 54 belonging to the latch 28$^a$ of shifting device 18 will be then energized and will lock said device to its arm 36, and said arm will then move and mesh the gears 12, 9. Likewise, setting of the lever 66 to point at "3rd" or highest speed and pressing of said pedal will energize the solenoid 54 belonging to latch 28$^b$ of shifting device 18 and will lock said device to its arm 36, and said arm will then move and mesh the internal gear 14 inside of gear 12 with the gear 5 for direct driving.

Should it be desired to unmesh or neutralize any coöperating pair of gears that may be meshed, without necessarily selecting any other speed or meshing any other pair of gears, the lever 66 may be set to point anywhere between any two of the speed indications upon indicator frame 68 so that the arm 57 is disposed at a place between any two of the contacts 60, 61, 62, 63, whereby upon subsequently pressing of the pedal 47 any gear that may be in mesh becomes unmeshed and restored to locked neutral position. It will be evident that with this mechanism any predetermined selection of speed desired may be made at any time before or after the swinging of the pedal 47 to perform the clutching operation of the driveshaft, and such speed selection may be also made at any time and stage during the clutching operation.

Variations may be resorted to within the scope of the invention, and portions of the improvements may be used without others.

Having thus described my invention, I claim:—

1. In an automobile, the combination with speed changing gears, of a pivoted member for each of said gears, means to actuate said members about their pivots, and means to lock any one of said gears to its member at either side of its pivot for moving the gear to positions in opposite directions from a neutral position.

2. In an automobile, the combination with speed changing gears, of a pivoted member for each of said gears, means to actuate said members about their pivots, and means to lock any one of said gears to its member at either side of its pivot for moving the gear to positions in opposite directions from a neutral position and to return said gear to neutral position from either position to which it has been moved.

3. In an automobile, the combination with a speed changing gear, of a pivoted member, means to actuate said member about its pivot, and means to lock said gear to said member at either side of its pivot and automatically at the end of a swing of said member for moving the gear to positions in opposite directions from a neutral position.

4. In an automobile, the combination with a speed changing gear, of a pivoted member, means to actuate said member about its pivot, and means to lock said gear to said member at either side of its pivot and automatically at the end of a swing of said member for moving the gear to positions in opposite directions from a neutral position and to return said member to neutral position from either of the positions to which it has been moved.

5. In an automobile, the combination with a speed changing gear normally locked in neutral positions, of a pivoted member, means to actuate said member about its pivot, and means to unlock said gear and lock it to said member and automatically at the end of a swing of said member for meshing the gear.

6. In an automobile, the combination with speed changing gears, of a pivoted member for each of said gears, means to actuate said members about their pivots, and means to lock any one of said gears to its member for meshing the gear.

7. In an automobile, the combination with speed changing gears, of a pivoted member for each of said gears, means to synchronously actuate said members about their pivots, and means to lock any one of said gears to its member at either side of its pivot for moving the gear to positions in opposite directions from a neutral position.

8. In an automobile, the combination with speed changing gears, of a pivoted member for each of said gears, means to actuate said members synchronously and parallelly to each other about their pivots, and means to lock any one of said gears to its member at either side of its pivot for moving the gear to positions in opposite directions from a neutral position.

9. In an automobile, the combination with speed changing gears, of a pivoted member for each of said gears, an actuating arm for each of said members, a rod pivotally joining said arms for operating the arms to actuate said members synchronously and parallelly to each other about their pivots, means to actuate said rod, and means to lock any one of said gears to its member at either side of its pivot for moving the gear to positions in opposite directions from a neutral position.

10. In an automobile, the combination with speed changing gears, of a shifting device for each of said gears, a pivoted member for each of said devices, means to actuate said members about their pivots, and means to connect any one of said devices to its member at either side of its pivot for moving the device and its gear to positions in opposite directions from a neutral position.

11. In an automobile, the combination with speed changing gears, of a shifting device for each of said gears, a pivoted member for each of said devices, means to actuate said members about their pivots, and means to connect any one of said members to its device at either of a plurality of places on the device for moving the device and its gear to positions in opposite directions from a neutral position.

12. In an automobile, the combination with speed changing gears, of a shifting device for each of said gears, a pivoted member for each of said devices, means to actuate said members about their pivots, and locking means for each of said devices to lock it to its member at either side of its pivot for moving the device in opposite directions from a neutral position.

13. In an automobile, the combination with speed changing gears, of a shifting device for each of said gears, a pivoted member for each of said devices, means to actuate said members about their pivots, and independently operated locking means for each of said devices to lock it to its member at either side of its pivot for moving the device in opposite directions from a neutral position.

14. In an automobile, the combination with speed changing gears, of a pivoted member for each of said gears, means to actuate said members about their pivots, and independently operated connecting means for each of said gears to connect it to its member at either side of its pivot for moving the gear to positions in opposite directions from a neutral position.

15. In an automobile, the combination with speed changing gears, of a pivoted member for each of said gears, means to actuate said members about their pivots, and independently operated connecting means for each of said gears to connect it to its member at either side of its pivot.

16. In an automobile, the combination with speed changing gears, of a shifting device for each of said gears, a pivoted member for each of said devices, means to actuate said members about their pivots, and means to lock any one of said devices to its member at either of a plurality of places on the member for moving the device to a plurality of positions.

17. In an automobile, the combination with speed changing gears, of a shifting device for each of said gears, a member for each of said gears pivoted to swing in a plane parallel to the axes of said gears, means to actuate said members about their pivots, and means to connect any one of said devices to its member at either side of its pivot for moving the device and its gear to positions in opposite directions from a neutral psition.

18. In an automobile, the combination with speed changing gears, of a shifting device for each of said gears, a member for each of said gears pivoted to swing in a plane parallel to the axes of said gears, means to actuate said members about their pivots, and an independently operated locking means for each of said devices to lock it to its member at either side of its pivot for moving the device in opposite directions from a neutral position.

19. In an automobile, the combination with speed changing gears, of a shifting device for each of said gears, a pivoted member for each of said devices, means to actuate said members about their pivots, and electrically operated means for each of said devices to lock it to its member.

20. In an automobile, the combination with speed changing gears, of a shifting device for each of said gears, a pivoted member for each of said devices, means to actuate said members about their pivots, and electrically operated means for each of said devices to lock it to its member at either side of its pivot for moving the device to positions in opposite directions from a neutral position.

21. In an automobile, the combination with a drive shaft, a clutch therefor, means to operate said clutch, and speed changing gears, of a pivoted member for each of said gears, means to lock any one of said gears to its member at either side of its pivot for moving the gear to positions in opposite directions from a neutral position, and means to actuate said members about their pivots through the operation of said clutch operating means.

22. In an automobile, the combination with a drive shaft, a clutch therefor, means to operate said clutch, and a speed changing gear, of a pivoted member, means to lock said gear to its member at either side of its pivot, and means to actuate said member about its pivot through the operation of said clutch operating means.

23. In an automobile, the combination with a speed changing gear, of a pivoted member, means to actuate said member about its pivot, and means to lock said gear to said member at either side of its pivot.

24. In an automobile, the combination with a drive shaft, a clutch therefor, a pedal to operate said clutch, and speed changing gears, of a pivoted member for each of said gears, means to lock any one of said gears to its member at either side of its pivot, and means to actuate said members about their pivots through the operation of said pedal.

25. In an automobile, the combination with a drive shaft, a clutch therefor, a pedal to operate said clutch, and speed changing gears, of a pivoted member for each of said gears, means to lock any one of said gears to its member at either side of its pivot, and means to actuate said members about their pivots through the operation of said pedal to move said locked gear to meshed position and to restore it to neutral position.

26. In an automobile, the combination with speed changing gears, of a selecting device for each coöperating pair of said gears, pivoted members, means to actuate said members about their pivots, and means to connect any one of said devices to one of said members at either side of its pivot.

27. In an automobile, the combination with speed changing gears, of a pivoted member, an arm extending from each coöperating pair of said gears to said member, means to connect said arm to said member at either side of its pivot, and means to actuate said member about its pivot.

28. In an automobile, the combination with speed changing gears, of pivoted members, a fixed support, an arm extending from each coöperating pair of gears to said members, a selecting device for each of said arms normally engaging said support, means to disengage any one of said devices from said support and to connect therewith its arm to one of said members, and means to actuate said members about their pivots.

29. In an automobile, the combination with speed changing gears, of pivoted members, a fixed support, an arm extending from each coöperating pair of gears to said members, said arms being normally locked to said support, means to disengage any one of said arms from said support and connect it to one of said members at either side of its pivot, and means to actuate said members about their pivots.

30. In an automobile, the combination with speed changing gears, of pivoted members, a fixed support, a gear of each coöperating pair of gears normally engaging said support, means to disengage any one of said gears from said support and connect it to one of said members at either side of its pivot, and means to actuate said members about their pivots.

31. In an automobile, the combination with speed changing gears, of pivoted members, an arm extending from each coöperating pair of gears to said members, a selecting device for each arm to connect it to one of said members, said device including a solenoid, and a latch actuated by said solenoid when energized to engage said arm to one of said members, and means to actuate said members about their pivots.

32. In an automobile, the combination with speed changing gears, of pivoted members, a fixed support, a selecting device normally engaging a gear of each coöperating pair of gears with said support, each of said devices having a solenoid, any one of said solenoids when energized disengaging its device from said support and engaging it with one of said members, and means to actuate said members about their pivots, said members when actuated rendering each of said remaining devices inoperative if its solenoid is accidentally energized.

33. In an automobile, the combination with speed changing gears, of pivoted members, means for each of said gears to lock it to one of said members, means to operate any one of said locking means, means to actuate said members about their pivots, and means to render said remaining locking means inoperative when said members are actuated.

34. In an automobile, the combination with speed changing gears, of shifting devices for said gears, latches for each of said devices, a pivoted member for each of said devices, means to actuate said members about their pivots, and means to set the latches of any one of said devices to lock the device to its member at either side of its pivot.

35. In an automobile, the combination with speed changing gears, of shifting devices for said gears, a fixed member, latches for each of said devices holding them locked to said fixed member, a pivoted member for each of said devices, means to actuate said members about their pivots, and means to set any one of said latches to unlock its device from said fixed member and to lock it to its pivoted member.

36. In an automobile, the combination with speed changing gears, of shifting devices for said gears, latches for each of said devices, a pivoted member for each of said devices, means to actuate said members about their pivots, and means to set the latches of any one of said devices to lock the device to its member at either side of its pivot for shifting the device by means of its member, said device when actuated carrying its latches therewith.

37. In an automobile, the combination with speed changing gears, of shifting devices for said gears, latches for each of said devices, a pivoted member for each of said devices, means to actuate said members about their pivots, arms for actuating said latches, and means to operate any one of said arms to set any one of said latches to lock its device to its member.

38. In an automobile, the combination with a speed changing gear, of a pivoted member, means to actuate said member about its pivot, means to lock said gear to said member at either side of its pivot for moving the gear to positions in opposite directions from a neutral position, and electrical means to operate said locking means.

39. In an automobile, the combination with speed changing gears, of a pivoted member for each of said gears, means to actuate said members about their pivots, means to lock any one of said gears to its member, and electrical means to operate said locking means.

40. In an automobile, the combination with speed changing gears, of a shifting device for each of said gears, a pivoted member for each of said devices, means to actuate said members about their pivots, means to connect any one of said devices to its member at either side of its pivot for moving the device and its gear to positions in opposite directions from a neutral position, circuits, and means therein to operate said connecting means.

41. In an automomile, the combination with speed changing gears, of a shifting device for each of said gears, a pivoted member for each of said devices, means to connect any one of said devices to its member at either side of its pivot for moving the device and its gear to positions in opposite directions from a neutral position, circuits, means therein to operate said connecting means, and means to simultaneously close one of said circuits and actuate said members about their pivots.

42. In an automobile, the combination with speed changing gears, of a shifting device for each of said gears, means to normally lock said device against movement, a pivoted member for each of said devices, means to actuate said members about their pivots, and means to release any one of said devices and to connect it to its member.

43. In an automobile, the combination with speed changing gears, of a shifting device for each of said gears, means to normally lock said devices against movement, a pivoted member for each of said devices, means to actuate said members about their pivots, means to release any one of said devices and to connect it to its member, and means to disconnect said device from its member and restore it to locked state.

44. In an automobile, the combination with a drive shaft, a clutch therefor, a pedal to operate said clutch, and speed changing gears, of a pivoted member for each of said gears, means to lock any one of said gears to its member, and means to actuate said members about their pivots through the operation of said pedal.

45. In an automobile, the combination with a drive shaft, a clutch therefor, a pedal to operate said clutch, and a speed changing gear, of a pivoted member, means to lock said gear to said member at either side of its pivot, and means to actuate said member about its pivot through the operation of said pedal.

46. In an automobile, the combination with a drive shaft, a clutch therefor, a pedal to operate said clutch, and a speed changing gear, of a pivoted member, means to lock said gear to said member at either side of its pivot, means to actuate said member about its pivot through the operation of said pedal, a circuit having means to operate said locking means, and means to close and break said circuit through the operation of said pedal.

47. In an automobile, the combination with speed changing gears, of a pivoted member for each of said gears, means to actuate said members about their pivots, and independently operated connecting means for each of said gears to connect it to its member.

48. In an automobile, the combination with a speed changing gear, of a pivoted member therefor, means to actuate said member about its pivot, and a plurality of independently operated connecting means for said gear to connect it to said member at either side of its pivot for moving the gear to positions in opposite directions from a neutral position.

49. In an automobile, the combination with speed changing gears, of a pivoted member for each of said gears, means to actuate said members about their pivots, and a plurality of independently operated connecting means for each of said gears to connect it to its member at either side of its pivot for moving the gear to positions in opposite directions from a neutral position.

50. In an automobile, the combination with speed changing gears, of a pivoted member for each of said gears, means to actuate said members about their pivots, and a plurality of independently operated connecting means for each of said gears to connect it to its member at either of a plurality of places on the member for moving the gear to a plurality of positions.

51. In an automobile, the combination with a speed changing gear, of a pivoted member therefor, means to actuate said member about its pivot, and a plurality of independently operated electrical connecting means for said gear to connect it to said member at either side of its pivot for moving the gear into and out of positions in opposite directions from a neutral position.

52. In an automobile, the combination with a speed changing gear, of a pivoted member therefor, means to actuate said member about its pivot, and a plurality of independently operated connecting means for said gear to connect it to said member at either of a plurality of places on the member for moving the gear into and out of a plurality of positions.

53. In an automobile, the combination with a drive shaft, a clutch therefor, means to operate said clutch, and speed changing gears, of a pivoted member for each of said gears, means to lock any one of said gears to its member, and means to actuate said members about their pivots through the operation of said clutch operating means.

54. In an automobile, the combination with a drive shaft, a clutch therefor, means to operate said clutch, and a speed changing gear, of a pivoted member, a plurality of independently operated connecting means for said gear to connect it to said member at either of a plurality of places upon the completion of its stroke in the unclutching operation for moving the gear to a plurality of positions, and means to actuate said member about its pivot through the operation of said clutch operating means.

55. In an automobile, the combination with a drive shaft, a clutch therefor, means to operate said clutch, and speed changing gears, of a pivoted member for each of said gears, a plurality of independently operated connecting means for each of said gears to connect it to its member at either of a plurality of places for moving the gear to a plurality of positions, and means to actuate said members about their pivots through the operation of said clutch operating means.

Signed at the city of New York, in the county of New York, and State of New York, this 9th day of September, A. D. 1916.

MERION J. HUGGINS.

Witnesses:
CHAS. W. LA RUE,
B. ROMAN.

Copies of this patent may be obtained for five cents each, by addressing the "Commissioner of Patents, Washington, D. C."